United States Patent [19]

Nakamura

[11] Patent Number: 4,872,731
[45] Date of Patent: Oct. 10, 1989

[54] VEHICULAR BRAKE CONTROL SYSTEM

[75] Inventor: Masatoshi Nakamura, Atsugi, Japan

[73] Assignee: Nissan Motor Company, Japan

[21] Appl. No.: 920,268

[22] Filed: Oct. 17, 1986

[30] Foreign Application Priority Data

Oct. 18, 1985 [JP] Japan ................................. 60-232380

[51] Int. Cl.⁴ .......................... B60T 8/86; B60T 13/16; B60T 8/58

[52] U.S. Cl. ...................................... 303/93; 303/10; 303/11; 303/100; 303/115

[58] Field of Search ...................... 303/6 C, 10, 11, 93, 303/100, 108, 109, 113, 114, 115, 116, 117, 119, 54, DIG. 3, DIG. 4, 105, 9.63

[56] References Cited

U.S. PATENT DOCUMENTS

| | | | |
|---|---|---|---|
| 3,702,713 | 11/1972 | Oberthur | 303/10 |
| 3,756,666 | 9/1973 | Leiber | 303/10 |
| 4,046,426 | 9/1977 | Miyake | 303/100 |
| 4,129,341 | 12/1978 | Pauwels | 303/10 X |
| 4,327,414 | 4/1982 | Klein | 303/108 |
| 4,428,623 | 1/1984 | Bertling et al. | 303/114 |
| 4,462,642 | 7/1984 | Leiber | 303/119 |
| 4,512,615 | 4/1985 | Kita et al. | 303/114 X |
| 4,576,417 | 3/1986 | Dobner | 303/114 X |
| 4,658,939 | 4/1987 | Kircher et al. | 303/20 X |
| 4,671,579 | 6/1987 | Sawano et al. | 303/20 X |
| 4,714,299 | 12/1987 | Takata | 303/100 X |

FOREIGN PATENT DOCUMENTS

| | | |
|---|---|---|
| 2430448 | 1/1976 | Fed. Rep. of Germany . |
| 3035537 | 5/1982 | Fed. Rep. of Germany . |
| 57-84254 | 5/1982 | Japan . |
| 60-64057 | 4/1985 | Japan . |
| 60-64058 | 4/1985 | Japan . |
| 60-78847 | 5/1985 | Japan . |

*Primary Examiner*—Andres Kashnikow
*Assistant Examiner*—Timothy Newholm
*Attorney, Agent, or Firm*—Leydig, Voit & Mayer

[57] ABSTRACT

In a vehicular brake control system, a hydraulic braking operation starting from a master cylinder and ending at a wheel cylinder is divided into two systems, i.e., starting from the master cylinder and ending at a stroke absorber (master cylinder system) and starting from a hydraulic generator and ending at the wheel cylinder (wheel cylinder system). Since the master cylinder system is provided with the stroke absorber, a relationship between a depression force imposed on a brake pedal and a brake stroke can be fixed. Since the wheel cylinder system is provided with an output hydraulic control valve controlled so as to produce a braking deceleration rate according to the depression force, another relationship between the depression force and braking deceleration rate can also be fixed.

11 Claims, 6 Drawing Sheets

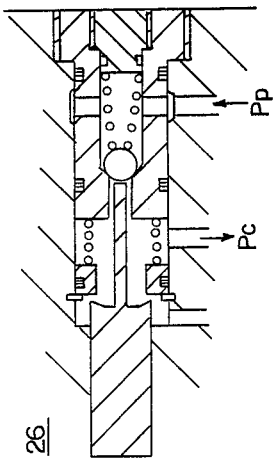
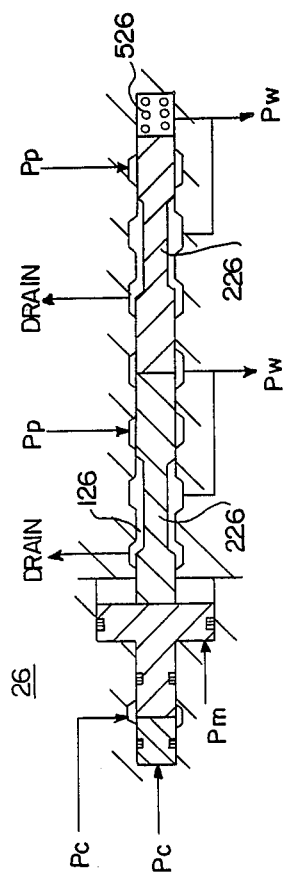
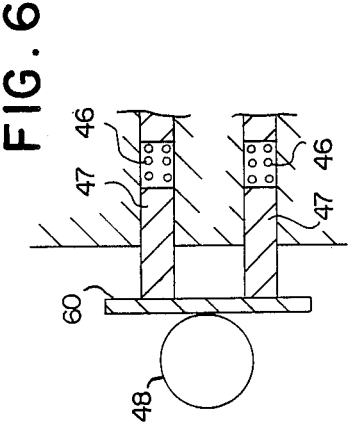

VEHICULAR BRAKE CONTROL SYSTEM

BACKGROUND OF THE INVENTION

The present invention relates to a vehicular brake control system.

A brake control system is exemplified by a Japanese Patent Application Unexamined Open No. Sho. 60-78847 published on May 4, 1985 (which corresponds to U.S. pat. application Ser. No. 655,553 filed on Sept. 28, 1984 and corresponds to EPC Patent Application file No. 84 111 721.1 filed on Oct. 1, 1984, and both U.S. and EPC cases have been abandoned).

In the above-identified Patent document, the brake control system controls an output of a brake booster in a brake system so that a relationship between a depression force imposed on a brake pedal and braking deceleration rate is maintained constant. More specifically; the brake control system disclosed in the above-identified Patent document includes: (a) a brake pedal; (b) first means for applying a braking force to the vehicle when the brake pedal is depressed; (c) a power booster for enhancing the braking force to an adjustable degree; (d) second means for sensing the depression force imposed on the brake pedal; (e) third means for determining a desired rate of deceleration of the vehicle on the basis of the sensed depression force; (f) fourth means for sensing the actual rate of deceleration of the vehicle; (g) fifth means for comparing the desired and actual deceleration rates; and (h) sixth means for increasing and decreasing the degree of enhancement of the braking force when the actual deceleration rate is less than and greater than the desired deceleration rate, respectively.

In the above-described brake control system, the braking force and braking deceleration rate can be fixed. However, since converting the output from the brake power booster into a hydraulic pressure starting from a master cylinder and ending at a wheel cylinder is carried out in a hydraulic circuit which is on the output side of the brake booster, the relationship changes between the braking force applied to the brake pedal and brake stroke due to influence derived from the hydraulic circuit side. Consequently, the brake control system gives a driver of the vehicle a sense of incompatibility between the force applied to the brake pedal and the brake stroke.

SUMMARY OF THE INVENTION

It is an object of the present invention to provide a vehicular brake control system which achieves both fixed relationships between the braking force (a depression force imposed on a brake pedal) and brake stroke (brake pedal stroke) and the braking force and braking deceleration rate.

The above-described object can be achieved by providing a brake control system, comprising: (a) a brake actuating member including a brake pedal, (b) first means for maintaing a constant relationship between a pedal stroke of the brake pedal and depression force imposed on the brake pedal, and (c) second means for maintaining a constant relationship between a braking deceleration rate and the depression force.

The above-described object can also be achieved by providing a brake control system, comprising: (a) a brake actuating member including a brake pedal, (b) first means for maintaining a constant relationship between a pedal stroke of the brake pedal and depression force imposed on the brake pedal, (c) second means for detecting a depression force imposed on the brake pedal, (d) third means for calculating an ideal braking deceleration rate on the basis of the depression force detected by the second means, (e) fourth means for detecting an actual braking deceleration rate, (f) fifth means for generating a deceleration control signal to adjust the actual braking deceleration rate so as to coincide with the ideal braking deceleration rate calculated by the third means.

The above-described object can also be achieved by providing a vehicular brake control system, comprising: (a) a brake pedal, (b) a master cylinder operatively connected to generate hydraulic pressure in fluid in the system accordance with a depression force imposed on the brake pedal, (c) at least one fluid passage means connected to the master cylinder (d) first means incorporated in the fluid passage means for absorbing a pedal stroke according to the depression force, (e) second means for producing an input pressure hydraulic when the brake pedal is depressed, (f) third means responsive to a signal weight derived from the hydraulic pressure of the master cylinder and from a control weight for converting the hydraulic pressure derived from the second means to an output hydraulic pressure for application to a wheel cylinder incorporated in a brake apparatus on a tire wheel, (g) fourth means for setting the control weight according to a control signal, (h) fifth means for detecting a braking deceleration rate, (i) sixth means for detecting the depression force applied to the brake pedal, and (j) seventh means for producing the control signal according to the braking deceleration rate detected by the fifth means so that the braking deceleration rate has a fixed relationship to the depression force applied to the brake pedal.

BRIEF DESCRIPTION OF THE DRAWINGS

FIG. 6 is a schematic view of another example of control weight setting means in the first through third preferred embodiments; and FIGS. 7 and 8 are schematic views of other examples of an output hydraulic control valve in the first through third preferred embodiments.

DETAILED DESCRIPTION OF THE PREFERRED EMBODIMENTS

Reference will be made to the drawings in order to facilitate understanding of the present invention.

Figure 1:
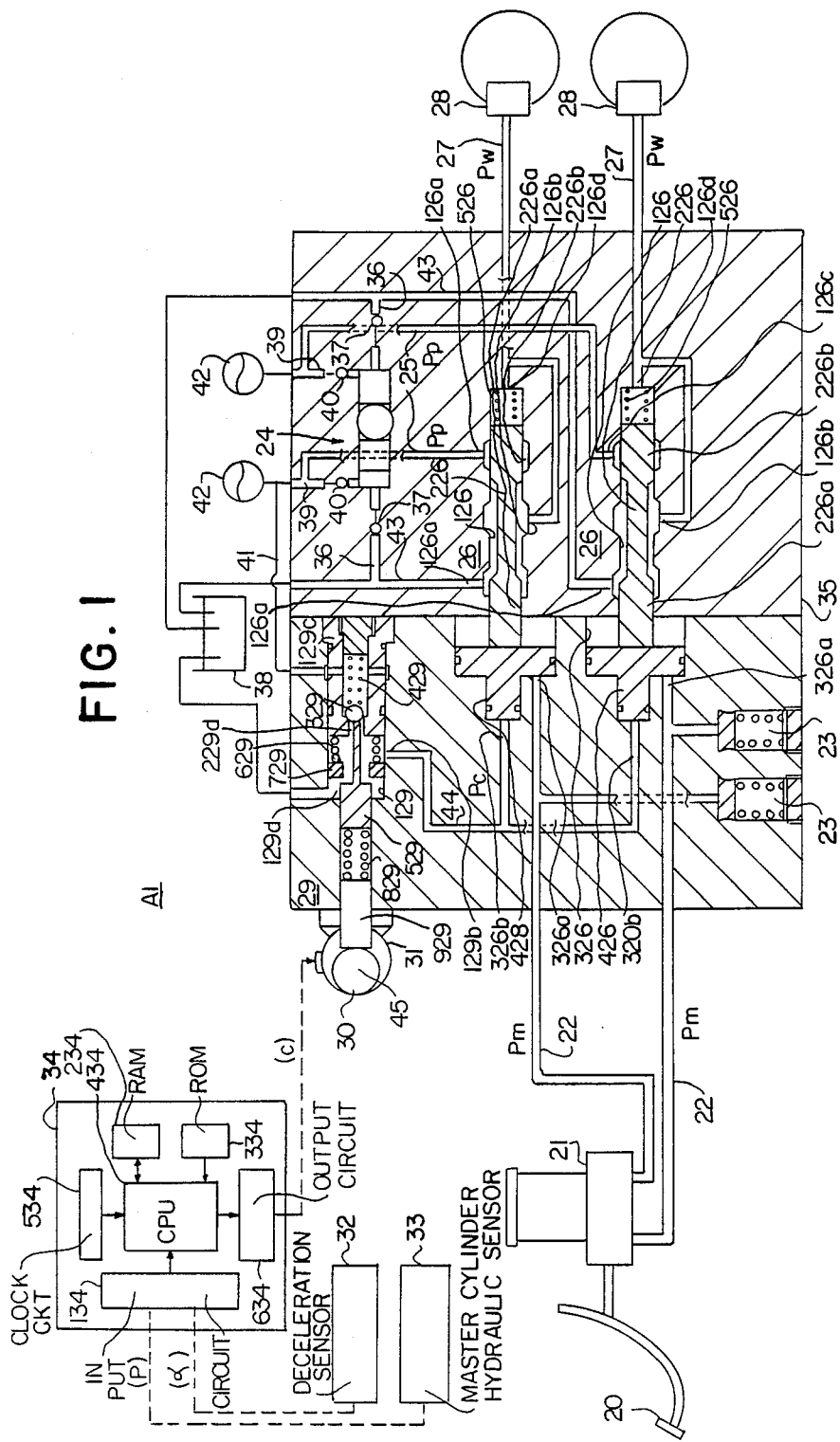
FIG. 1 is a schematic view of a vehicular brake control system in a first preferred embodiment according to the present invention.

FIG. 1 shows a first preferred embodiment according to the present invention.

A brake control system A1 in the first preferred embodiment can largely be divided into: (a) a master cylinder hydraulic system; (b) a wheel cylinder hydraulic system; (c) control weight setting means; (d) an input sensor group; and (e) a control unit 34 constituted by a microcomputer.

The master cylinder hydraulic control system comprises: (a) a brake pedal 20; (b) a master cylinder 21; (c) master cylinder hydraulic passages 22, 22; and (d) accumulators (stroke absorbing means) 23, 23.

The wheel cylinder hydraulic system comprises a fluid pressure pump (hydraulic pressure generating means) 24; input hydraulic passages 25, 25; output hydraulic control valves 26, 26; wheel cylinder hydraulic passages 27, 27; and wheel cylinders 28, 28.

The control weight setting means comprises: (a) a control signal responsive hydraulic valve 29; (b) an eccentric cam 30; and (c) a servo motor 31. The input sensor group comprises: a deceleration sensor 32; and a master cylinder hydraulic sensor (depression force sensor) 33. The master cylinder provides a means for converting the depression force imposed on the brake pedal 20 into a hydraulic pressure.

The master cylinder 21 is exemplified by two U.S. patent applications Ser. No. 760,511 filed on July 30, 1985 now allowed (which corresponds to a West German patent application file No. P3527455.7 filed on July 31, 1985 ) and Ser. No. 760,561 filed on July 30, 1985 (which corresponds to a West German Patent Application file No. P3527448.4 filed on July 31, 1985). The subject matter disclosed in the two U.S. Patent Applications is hereby incorporated by reference.

The master cylinder hydraulic passages 22, 22 are fluid passages for communicating fluid in the system having a hydraulic pressure $P_m$ generated in the master cylinder 21 as a result of the brake pedal being depressed. One master cylinder hydraulic passage 22 is a front-side master cylinder hydraulic passage and the other master cylinder hydraulic passage 22 is a rear-side master cylinder hydraulic passage. It is noted that the hydraulic passage includes an oil passage formed in a pipe and an oil passage formed in a valve body 35.

The accumulators 23, 23 are installed within the master cylinder hydraulic passages 22, 22, respectively. The accumulators 23, 23 provide means for receiving oil having the master cylinder hydraulic pressure $P_m$ when the brake pedal 20 is depressed and for maintaining a fixed relationship of a pedal stroke with respect to the brake pedal depression force imposed on the brake pedal 20 in the same way as carrying out a braking operation with the master cylinder hydraulic pressure directly supplied to the wheel cylinder. The accumulators 23, 23 are formed within the valve body 35.

The oil pressure pump 24 serves as a hydraulic source for generating a hydraulic pressure to the wheel cylinders 28, 28 when the brake pedal 20 is depressed.

Suction fluid passages 36, 36 of the fluid pressure pump 24 are connected to a reserve tank 38 via one-way valves 37, 37 and drain fluid passages 39, 39 are connected to output hydraulic control valves 26, 26 by means of input hydraulic passages 25, 25) and a hydraulic valve 29 (by means of input hydraulic passage 41). Accumulators 42, 42 are installed within the suction fluid passages 39, 39 for reducing hydraulic pressure variations.

Output hydraulic control valves 26, 26 are valves for converting an input hydraulic pressure $P_p$ derived from the fluid pressure pump 24 to an output hydraulic pressure $P_w$ to the wheel cylinders 28, 28. The valves 26, 26 of the same construction are juxtaposed in the valve body 35. Each output hydraulic control valve has valve holes 126 having ports 126a through 126d, a spool 226 having lands 226a, 226b corresponding to the valve hole 126 and which is movable in an axial direction, a height difference piston hole 326 formed at a left side of the spool 226 as viewed from FIG. 1, a height difference piston 426, and a spring 526 for biasing the spool in the left direction as viewed from FIG. 1.

The port 126a is connected to a drain fluid passage 43. The port 126c is connected to an input hydraulic passage 25. The ports 126b, 126d are connected to the output hydraulic passage 27.

In addition, the port 326a is connected to a master cylinder hydraulic passage 22. The port 326b is connected to a control signal hydraulic passage 44.

The wheel cylinders 28, 28 are installed on braking apparatus at the front and rear tire wheels (such as disk brakes or drum brakes) and constitute members for applying braking forces for the tire wheels in response to output hydraulic pressure $P_w$.

The control-signal-responsive hydraulic valve 29 is a hydraulic control valve for producing the control-signal-responsive hydraulic pressure $P_c$ sent to the output hydraulic control valve 26 in response to the control signal (c). The valve 29 is installed within the valve body 35.

The control-signal-responsive hydraulic valve 29 includes: valve holes 129 having ports 129a through 129c; a valve seat member 229 having a communication hole 229a and fixed to a valve hole 129; a ball 329 disposed on a part of the communication hole 229a; a spring 429 for biasing the ball 329 in the valve closure direction; a push rod 529 which presses the ball 329 in a valve opening direction; a spring 629 and piston 729 which bias the push rod 529 in the valve closure direction; and a spring 829 and cam rod 929 which bias the push rod in the valve open direction.

The port 129a is a drain port. The port 129b is connected to the control-signal-responsive hydraulic passage 44. The port 129c is connected to the input hydraulic passage 41.

The eccentric cam 30 is installed on an end surface of a cam rod 929 of the above-described control-signal-responsive hydraulic valve 29 with its cam surface 30 brought in close contact with the end surface under pressure. An eccentric shaft 45 of the eccentric cam 30 is attached to a servo motor 31. When the servo motor 31 rotates in a normal direction, the cam rod 929 is urged to the right as viewed from FIG. 1. When the servo motor 31 rotates in a reverse direction, the cam rod 929 is returned to the left as viewed from FIG. 1.

Next, the deceleration sensor 32 is used for detecting a deceleration of the vehicle and for producing a deceleration signal ($\alpha$) according to the deceleration rate.

The master cylinder hydraulic sensor 33 is used for detecting the master cylinder hydraulic pressure $P_m$ and for producing a hydraulic pressure signal (P) according to the brake pedal depression force.

The control unit 34 inputs the deceleration signal ($\alpha$) derived from the above-described deceleration sensor 32 and the hydraulic signal (P) derived from the above-described master cylinder hydraulic sensor 33, processes these signals in accordance with a predetermined processing condition, and outputs the control signal (c) indicating a braking deceleration according to the depression force on the brake pedal 20. The control unit 34 includes an Input circuit 134, a RAM (Random Access Memory) 234, a ROM (Read Only Memory) 334, a CPU (Central Processing Unit) 434, a clock circuit 534, and an output circuit 634.

It is noted that the Input circuit 134 amplifies the input signals and converts them into another signal form in a state of which the CPU 434 can process them. The RAM 234 is a read/write memory capable of storing temporarily information during arithmetic operations of input signals. The ROM 334 is a read memory in which information required for control processings is previously stored. The CPU 434 carries out comparison, arithmetic operations in accordance with a predetermined processing routine. The clock circuit 534 sets a control processing period. The Output circuit 634 produces the control signal (c) on the basis of the arithmetic operation result derived from the CPU 434.

Next, an operation of the first preferred embodiment will be described below.

Figure 2:
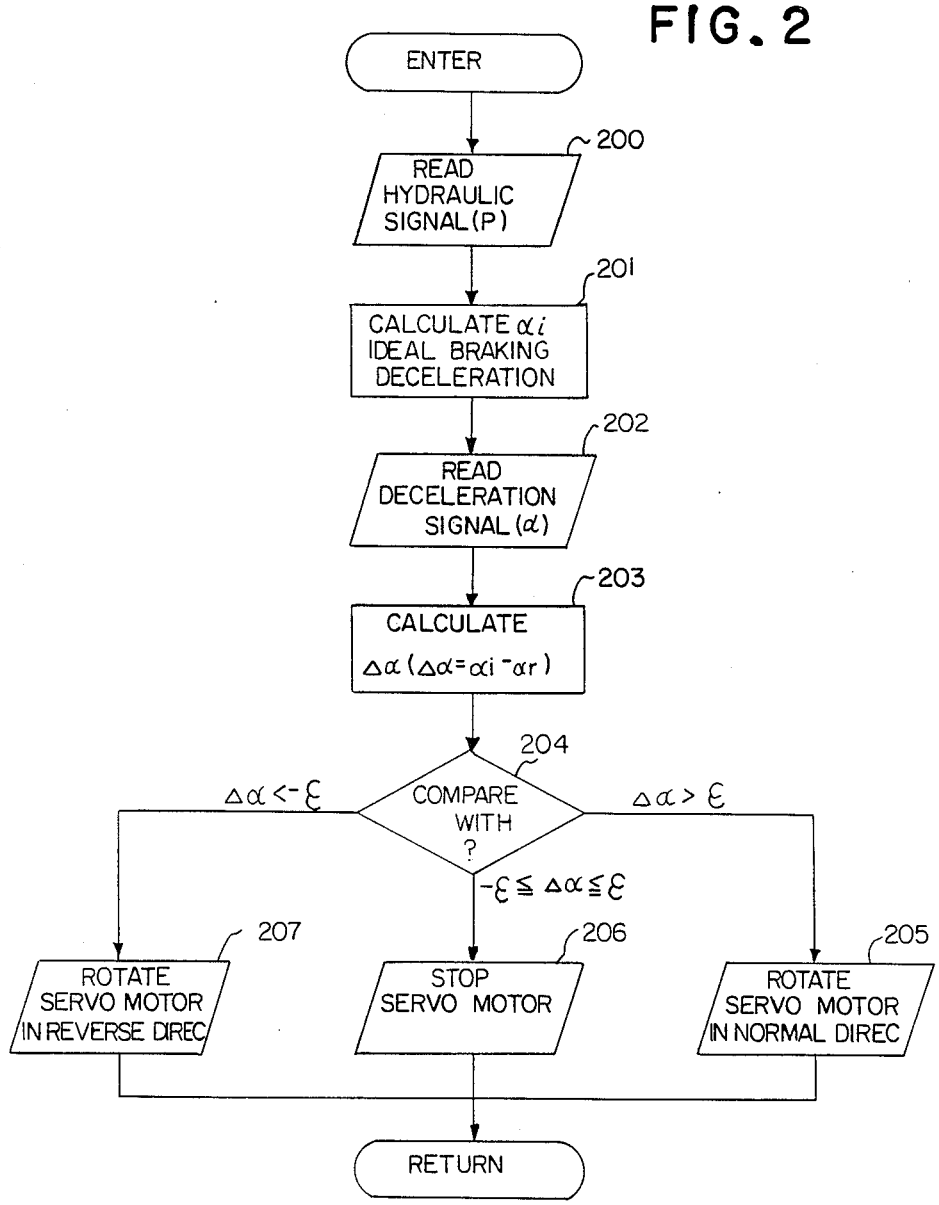
FIG. 2 is an operational flowchart representing a braking control flow executed in a control unit shown in FIG. 1.

The control operation of the control unit 34 in the first preferred embodiment will first be described below with reference to FIG. 2.

(A) A case in which an actual braking deceleration rate is smaller than an ideal braking deceleration rate.

In this case, the flow of the braking operation is step 200→step 201→step 202→step 203→step 204→step 205. In the step 205, the control signal (c) is outputed which rotates the servo motor 31 in the normal direction.

More specifically in step 200, the CPU 434 reads a hydraulic signal (P) corresponding to the depression force.

In step 201, the CPU 434 calculates the ideal braking deceleration $\alpha_i$ from the fluid pressure signal (P) (master cylinder hydraulic pressure $P_m$) read in step 200. The calculation equation is previously stored in the ROM 334 in a form of $\alpha_i = \text{Func}(P_m)$.

In step 202, the CPU 434 reads the deceleration signal ($\alpha$) derived from the deceleration sensor 32.

In step 203, the CPU 434 calculates the braking deceleration difference $\Delta\alpha$ from the ideal braking deceleration rate $\alpha_i$ calculated in step 201 and from the actual braking deceleration $\alpha_r$ determined by the read deceleration signal in step 202. The calculation equation is in the form of $\Delta\alpha = \alpha_i - \alpha_r$.

In step 204, the CPU 434 compares the braking deceleration difference $\Delta\alpha$ with a setting value $\epsilon$. The setting value $\epsilon$ is set to a value in the deceleration rate difference requiring no control.

(B) A case in which the actual braking deceleration rate accords substantially with the ideal braking deceleration rate.

In this case, the flow of the braking operation is step 200→step 201→step 202→step 203→step 204→step 206. In step 206, the servo motor 31 is stopped in response to the control signal (c).

(C) A case in which the actual braking deceleration rate is larger than the ideal braking deceleration rate.

The flow of the braking operation is step 200→step 201→step 202→step 203→step 204→step 207. In step 207, the control signal (c) is output so that the servo motor 31 is rotated in the reverse direction.

For example, when the actual braking deceleration rate $\alpha_r$ is smaller than the ideal braking deceleration rate $\alpha_i$, a hydraulic control signal $P_c$ is produced from the control-signal-responsive hydraulic valve 29. A high-pressure hydraulic output $P_w$ is sent to the wheel cylinders 28, 28 with hydraulic control signal $P_c$ being a pressure signal. The actual braking deceleration rate approaches the ideal braking deceleration rate when the braking force is increased.

If the actual braking deceleration rate $\alpha_r$ approaches the ideal braking deceleration rate $\alpha_i$ and the braking deceleration rate $\Delta\alpha$ falls within the setting value $\epsilon$, the servo motor 31 is stopped and the following relationship is maintained;, i.e., $\Delta\alpha| < \epsilon$.

Furthermore, when the actual braking deceleration rate $\alpha_r$ becomes larger than the ideal braking deceleration rate $\alpha_i$, the servo motor 31 is rotated in the reverse direction and the output hydraulic pressure $P_w$ is reduced. In this way, the actual and ideal braking decelerations $\alpha_r$ and $\alpha_i$ are always monitored and the output hydraulic pressure $P_w$ is controlled so that both braking control-signal-responsive deceleration rates substantially coincide with each other.

It is noted that the output hydraulic control valve 26 controls the input hydraulic pressure $P_p$ to produce the output hydraulic pressure $P_w$. The hydraulic pressure $P_w$ increases in proportion to the increase in the master cylinder hydraulic pressure $P_m$ with the hydraulic control signal $P_c$ acting in the valve open direction, the master cylinder hydraulic pressure $P_m$, and output hydraulic pressure $P_w$ acting in the valve closure direction. The hydraulic pressure $P_c$ acts as a pressure signal and carries out the control of the output hydraulic pressure $P_w$ according to the magnitude of the control signal hydraulic pressure $P_c$.

As described above, since in the brake control system A1 of the first preferred embodiment the hydraulic circuit from the master cylinder to the wheel cylinder is divided into two systems, i.e., master cylinder hydraulic system and wheel cylinder hydraulic system the master cylinder hydraulic system is provided with the accumulators 23 for absorbing the pedal stroke of the brake pedal 20 so that the relationship between brake depression force and brake stroke can be maintained at a constant and the brake feeling is not worsened.

In addition, the wheel cylinder hydraulic system is provided with the output hydraulic control valves 26. Since each control valve 26 is controlled in such a way that the braking deceleration rate is derived according to the master cylinder hydraulic pressure $P_m$ (which corresponds to the brake depression force), the relationship between the brake depression force and braking deceleration rate can be maintained at a constant.

Furthermore, since in this embodiment all of the accumulators 23, 23, fluid pressure pump 24, output hydraulic control valves 26, 26, control signal hydraulic valve 29, and fluid passage are housed within a single valve body 35, the whole system can be compacted.

Next, a second preferred embodiment according to the present invention will be described with reference to FIG. 3.

In the brake control system A2 of the second preferred embodiment, the control weight setting means comprises springs 46, 46, push rods 47, 47, eccentric cams 48, 48, and servo motors 49, 49. The control weight setting means converts the weight imposed by the eccentric cam 48, 48 into biasing forces of the springs 46, 46 and the control signal weight $F_c$ is imposed on the height difference piston 426 of the output hydraulic control valve 26.

Figure 3:
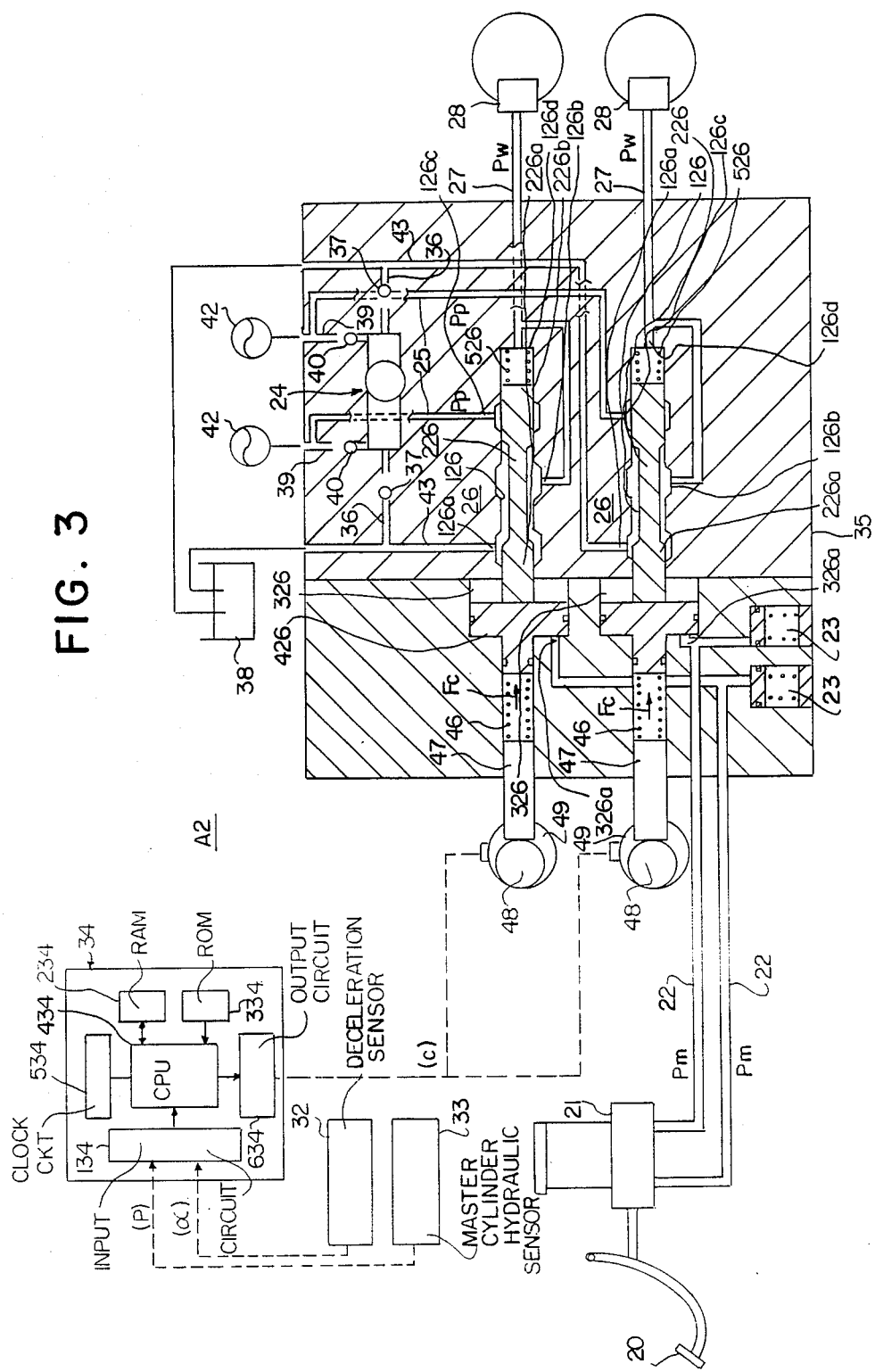
FIG. 3 is a schematic view of the vehicular brake control system in a second preferred embodiment according to the present invention.

It is noted that since the other construction is the same as that of the first embodiment, the like reference numerals shown in FIG. 3 designate corresponding elements shown in FIG. 1 and the detailed descriptions thereof are omitted here.

Figure 4:
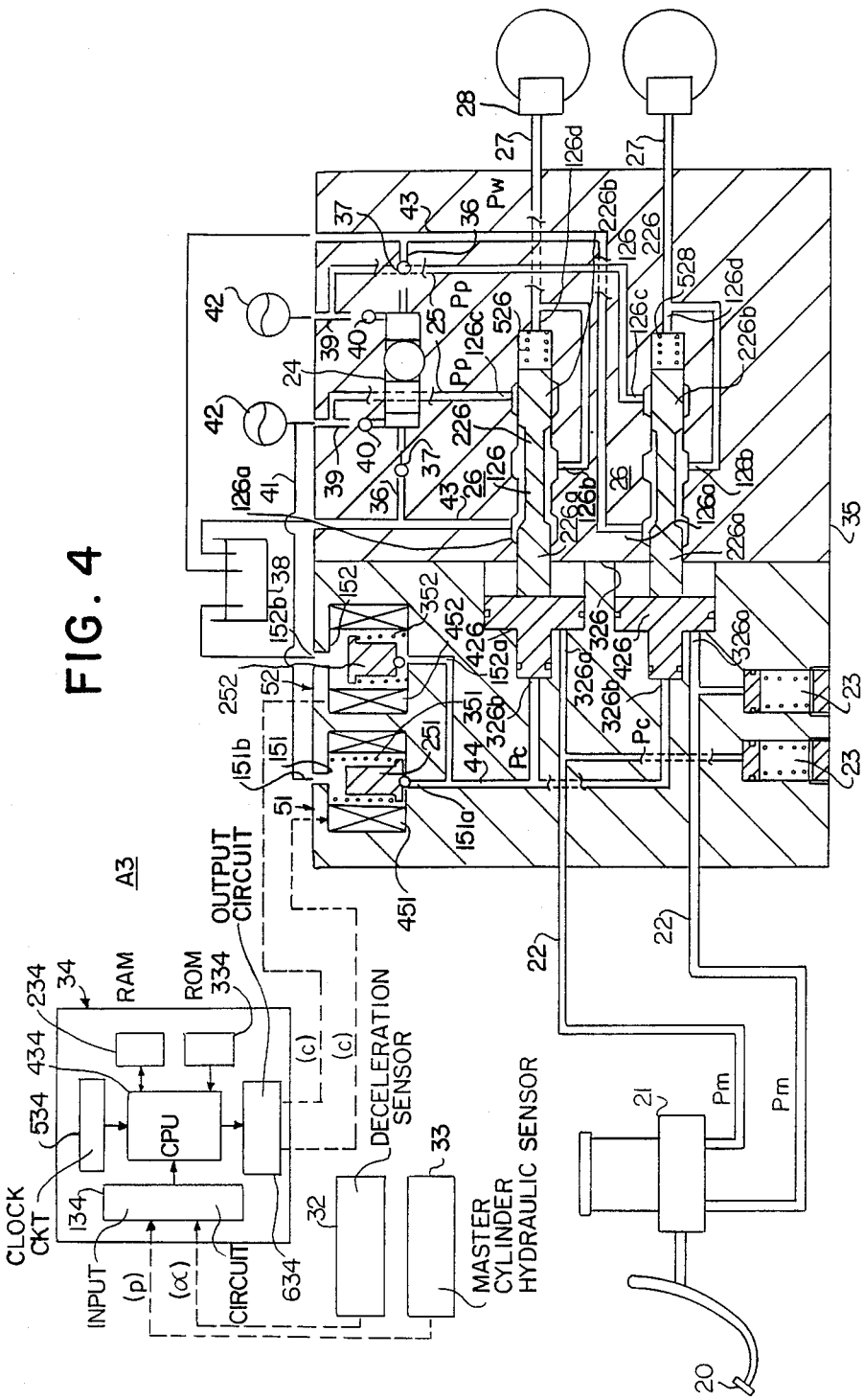
FIG. 4 is a schematic view of the vehicular brake control system in a third preferred embodiment according to the present invention.

Next, a third preferred embodiment according to the present invention is shown in FIG. 4.

In the brake control system in the third preferred embodiment, the control weight setting means comprises a normally closed first solenoid valve 51 which outputs a high-pressure control signal pressure $P_c$ when the valve 51 is opened and a normally opened second solenoid valve 52 which drains the control signal pressure $P_c$ when the valve is opened.

Each solenoid valve 51, 52 comprises: a valve hole 151, 152 having ports 151a, 151b, 152a, and 152b; a valve member 251, 252 which opens and closes the ports 151a, 152a; a spring 351, 352 which biases the valve member 251, 252; and a solenoid 451, 452 which imposes an electromagnetic force on the valve member 251, 252. The ports 151a, 152a are connected to the control signal hydraulic oil passage 44. The port 151b is connected to the input hydraulic passage 41. The port 152b is connected to a reserve tank 38. It is noted that since the other construction is the same as that of the first preferred embodiment, the like reference numerals shown in FIG. 4 designate corresponding elements described with reference to FIG. 1 and the detailed descriptions thereof are omitted here.

Figure 5:
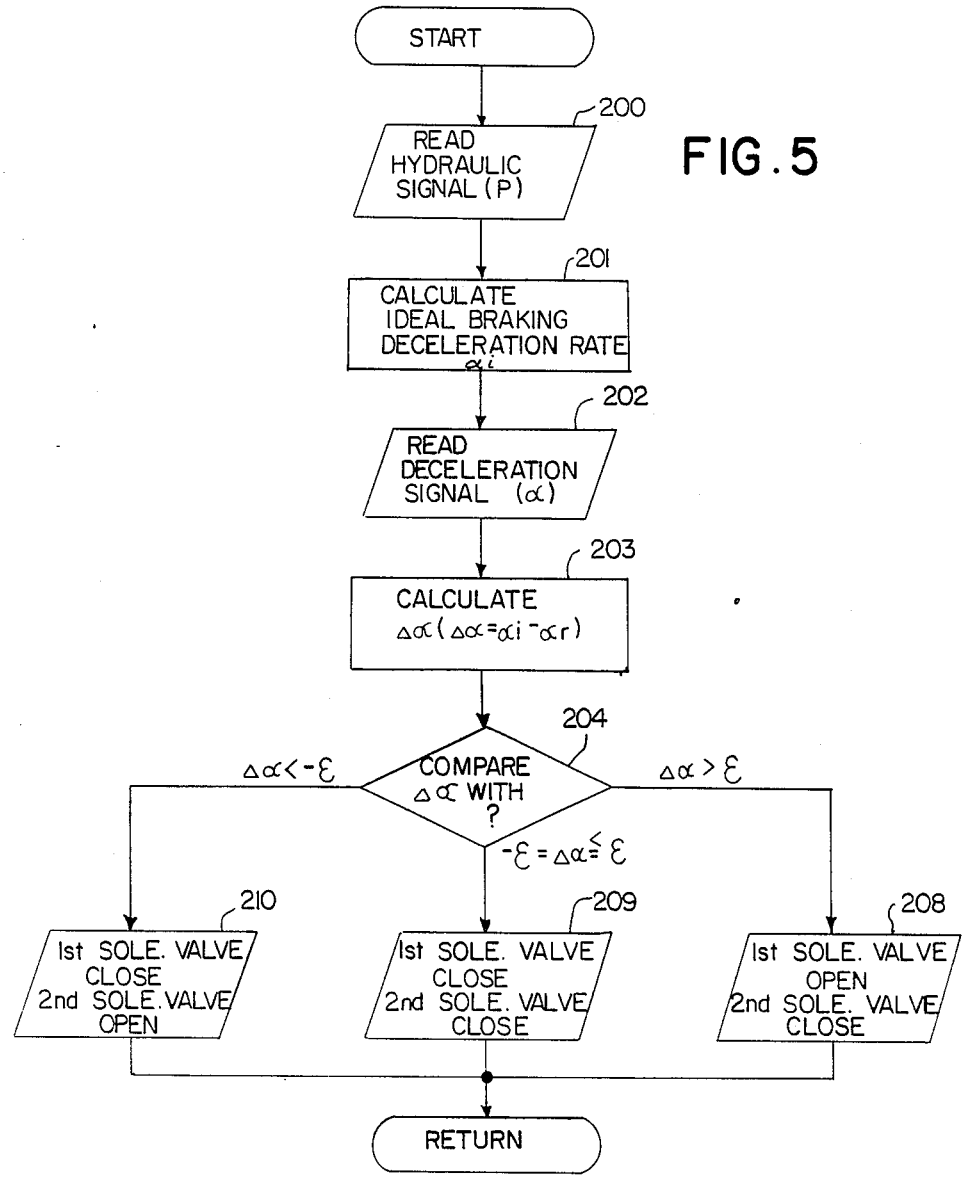
FIG. 5 is an operational flowchart representing the braking control flow executed in the control unit shown in FIG. 4.

In addition, although the flow of braking operation executed in the control unit 34 of the third preferred embodiment is shown in FIG. 5 and output steps 208, 209, and 210 are different from those steps 205, 206, and 207 in the first preferred embodiment, the other operations are the same as those in the first preferred embodiment. Therefore, the detailed descriptions are omitted here.

The present invention has been described with reference to the three preferred embodiments shown in the corresponding drawings. However, various changes and modifications may be made without departing from the scope of the present invention.

For example, although a spool valve type output hydraulic control valve is shown in these embodiments, a ball type control valve shown in FIG. 7 or other types of control valves may be used. The ball-type control valve is used for the control hydraulic signal valve.

In addition, although in these embodiments two juxtaposed output hydraulic control valves are exemplified, these two valves may be installed in series with each other as shown in FIG. 8.

Although in the second preferred embodiment the eccentric cam and servo motor is used for the respective push rods as the control weight setting means, a plate 60 may be added to connect the push rods 47 with each other and to integrate the eccentric cam with the servo motor (see FIG. 6).

In addition, although in these embodiments a master cylinder hydraulic sensor which indirectly detects the brake depression force is exemplified, a brake depression force sensor which directly detects the brake depression force or which detects the brake depression force through a stroke of the master cylinder or accumulator may alternatively be used.

Furthermore, although in these embodiments there is illustrated a deceleration sensor which directly detects the deceleration a deceleration sensor which indirectly detects the deceleration may alternatively be used. For example, a vehicle speed sensor (the deceleration can be calculated through an arithmetic operation on the basis of its detection signal) or wheel weight sensor may be used.

In the brake control system according to the present invention, the hydraulic circuit from the master cylinders to the wheel cylinders is divided into two systems, i.e., from the master cylinders to the stroke absorbing means and from the hydraulic generating means to the wheel cylinders. One master cylinder hydraulic system has stroke absorbing means and the other wheel cylinder hydraulic system has an output hydraulic control valve, and the output hydraulic control valve is controlled so as to produce the braking deceleration rate according to the depression force imposed on the brake pedal, this relationships between the brake pedal depression force and brake stroke and between the brake pedal depression force and braking deceleration rate can be maintained constant.

What is claimed is:

1. A vehicular brake control system comprising:
   (a) a brake pedal;
   (b) a master cylinder operatively connected to said brake pedal to generate hydraulic pressure in fluid in the system in accordance with a depression force imposed on said brake pedal;
   (c) at least one fluid passage connected to said master cylinder;
   (d) first means incorporated in said fluid passage for maintaining a fixed relationship between a stroke of said brake pedal and the depression force imposed on said brake pedal;
   (e) second means for producing an input hydraulic pressure when said brake pedal is depressed;
   (f) third means responsive to the hydraulic pressure of said master cylinder in said at least one fluid passage and to a control hydraulic pressure for converting the input hydraulic pressure derived from said second means to an output hydraulic pressure for application to a wheel cylinder incorporated in a brake apparatus on a vehicle tire wheel;
   (g) fourth means for generating the control hydraulic pressure in accordance with a control signal;
   (h) fifth means for detecting a braking deceleration rate;
   (i) sixth means for detecting the depression force applied to said brake pedal; and
   (j) seventh means for producing said control signal according to the braking deceleration rate detected by said fifth means so that the braking deceleration rate has a fixed relationship to the depression force applied to said brake pedal.

2. A brake control system for a vehicle comprising:
   (a) a brake actuating member including a brake pedal;
   (b) first means for maintaining a constant relationship between a pedal stroke of said brake pedal and a depression force imposed on said brake pedal;
   (c) second means for detecting the depression force imposed on said brake pedal;
   (d) third means for calculating an ideal braking deceleration rate on the basis of the depression force detected by said second means;
   (e) fourth means for detecting an actual braking deceleration rate; and
   (f) fifth means for generating a deceleration control signal to adjust the actual braking deceleration rate so as to coincide with the ideal braking deceleration rate calculated by said third means, wherein said brake actuating member further includes a master cylinder operatively connected to said brake pedal to generate hydraulic pressure in fluid in the system in accordance with the depression force imposed on said brake pedal and at least one fluid passage means connected to said master cylinder, wherein said first means comprises at least one accumulator means connected to said fluid passage means to receive fluid having a hydraulic pressure derived from the master cylinder and corresponding to the depression force, wherein said fifth means comprises:

(g) sixth means for generating an input hydraulic pressure;

(h) at least one output hydraulic control valve means which utilizes the master cylinder hydraulic pressure and a control hydraulic pressure for converting the input hydraulic pressure to an output hydraulic pressure for application to a wheel cylinder associated with a brake apparatus of a vehicle;

(i) seventh means for generating the control hydraulic pressure; and (j) eighth means for outputting the deceleration control signal in such a manner that the actual braking deceleration rate is adjusted to substantially coincide with the ideal braking deceleration rate calculated by said third means.

3. The system according to claim 2 wherein said fluid passage means comprises a front wheel master cylinder hydraulic passage and a rear wheel master cylinder hydraulic passage and wherein said accumulator means is installed within each of said front and rear wheel master cylinder hydraulic passages.

4. The system according to claim 2 wherein said output hydraulic control valve means comprises two valves of the same construction juxtaposed to each other and corresponding, respectively, to front and rear wheel cylinders, and wherein said sixth means comprises a fluid pressure pump connected to a fluid reserve tank and said output hydraulic control valve means and wherein said seventh means comprises a control-signal-responsive hydraulic valve means to produce a control-signal-responsive hydraulic pressure to said output hydraulic control valve means according to the deceleration control signal derived from the eighth means.

5. The system according to claim 4 further comprising a valve body to integrally house said accumulator, said fluid pressure pump, said output hydraulic control valve means, said control-signal-responsive hydraulic valve means, and said fluid passage means.

6. The system according to claim 4 wherein said seventh means further comprises a normally closed first solenoid valve member which outputs an increased control signal pressure to said output hydraulic control valve when said first solenoid valve member is opened in response to the deceleration control signal derived from said eighth means and a normally open second solenoid value member which drains the control signal pressure in response to the deceleration control signal derived from said eighth means.

7. The system according to claim 4 wherein said control-signal-responsive hydraulic valve means is of the spool-type.

8. The system according to claim 4 wherein said control-signal-responsive hydraulic valve means is of the ball-type.

9. The system according to claim 4 wherein said valves of said output hydraulic control valve means are of the same construction and linked together.

10. A brake control system for a vehicle comprising:

(a) a brake actuating member including a brake pedal, a master cylinder operatively connected to said brake pedal to generate hydraulic pressure in fluid in the system in accordance with a depression force imposed on said brake pedal, and at least one fluid passage means connected to said master cylinder;

(b) first means including at least one accumulator means connected to said fluid passage means to receive fluid having a hydraulic pressure derived from said master cylinder and corresponding to the depression force so as to maintain a constant relationship between a pedal stroke of said brake pedal and the depression force;

(c) second means for detecting the depression force imposed on said brake pedal;

(d) third means for calculating an ideal braking deceleration rate on the basis of the depression force detected by said second means;

(e) fourth means for detecting an actual braking deceleration rate; and (f) fifth means for generating a deceleration control signal to adjust the actual braking deceleration rate so as to coincide with the ideal braking deceleration rate calculated by said third means;

said fifth means including:

sixth means having a fluid pressure pump connected to a fluid reserve tank for generating an input hydraulic pressure;

at least one output hydraulic control valve means having two valves of the same construction juxtaposed to each other and corresponding, respectively, to respective wheel cylinders and utilizing the master cylinder hydraulic pressure and a control hydraulic pressure for converting the input hydraulic pressure to an output hydraulic pressure for application to the respective wheel cylinders associated with a brake apparatus of the vehicle;

seventh means for setting the control hydraulic pressure; and eighth means for outputting a deceleration control signal in such a manner that the actual braking deceleration rate is adjusted to substantially coincide with the ideal braking deceleration rate calculated by said third means;

said seventh means comprising a control-signal-responsive hydraulic valve means connected to said fluid pressure pump to produce a control-signal-responsive hydraulic pressure to said output hydraulic control valve according to the deceleration control signal; an eccentric cam rotating on a shaft and engaged with a cam rod of said control-signal-responsive hydraulic valve means; and a servo motor having an output shaft which is connected to said shaft of said eccentric cam, said servo motor rotating in a direction to increase or decrease the control hydraulic pressure in accordance with the deceleration control signal.

11. A brake control system for a vehicle comprising:

(a) a brake actuating member including a brake pedal, a master cylinder operatively connected to said brake pedal to generate hydraulic pressure in fluid in the system in accordance with a depression force imposed on said brake pedal, and at least one fluid passage means connected to said master cylinder;

(b) first means including at least one accumulator means connected to said fluid passage mans to receive fluid having a hydraulic pressure derived from said master cylinder and corresponding to the depression force so as to maintain a constant relationship between a pedal stroke of said brake pedal and the depression force;
(c) second means for detecting the depression force imposed on said brake pedal;
(d) third means for calculating an ideal braking deceleration rate on the basis of the depression force detected by said second means;
(e) fourth means for detecting an actual braking deceleration rate; and
(f) fifth means for generating a deceleration control signal to adjust the actual braking deceleration rate so as to coincide with the ideal braking deceleration rate calculated by said third means;
said fifth means including:
sixth means having a fluid pressure pump connected to a fluid reserve tank for generating an input hydraulic pressure;
at least one output hydraulic control valve means having two valves of the same construction juxtaposed to each other and corresponding, respectively, to respective wheel cylinders and utilizing the master cylinder hydraulic pressure and a control hydraulic pressure for converting the input hydraulic pressure to an output hydraulic pressure for application to the respective wheel cylinders associated with a brake apparatus of the vehicle;
seventh means for setting the control hydraulic pressure; and
eighth means for outputting a deceleration control signal in such a manner that the actual braking deceleration rate is adjusted to substantially coincide with the ideal braking deceleration rate calculated by said third means;
said seventh means comprising control-signal-responsive hydraulic valve means including at least one height difference piston, an eccentric cam rotating on a shaft and engaged with a cam rod of said control-signal-responsive hydraulic valve means, a servo motor having an output shaft which is connected to the shaft of said eccentric cam to adjust the control hydraulic pressure, and spring means connected to receive the control hydraulic pressure and for applying the control hydraulic pressure to said height difference piston when the servo motor is rotated in a predetermined direction according to the deceleration control signal.

* * * * *